US008831424B2

(12) United States Patent
Pastorelli et al.

(10) Patent No.: US 8,831,424 B2
(45) Date of Patent: *Sep. 9, 2014

(54) CHANNEL VALIDATION IN OPTICAL NETWORKS USING MULTI-CHANNEL IMPAIRMENT EVALUATION

(75) Inventors: Rosanna Pastorelli, Melegnano (IT); Stefano Piciaccia, Milan (IT); Alberto Tanzi, Trezzano sul Naviglio (IT); Eliana Silvia Vercelli, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 808 days.

This patent is subject to a terminal disclaimer.

(21) Appl. No.: 12/432,765

(22) Filed: Apr. 30, 2009

(65) Prior Publication Data

US 2010/0272435 A1    Oct. 28, 2010

Related U.S. Application Data

(63) Continuation-in-part of application No. 12/430,902, filed on Apr. 28, 2009.

(51) Int. Cl.
| | | |
|---|---|---|
| H04B 14/00 | (2006.01) | |
| H04B 10/00 | (2013.01) | |
| H04J 14/02 | (2006.01) | |
| H04B 10/079 | (2013.01) | |
| H04Q 11/00 | (2006.01) | |

(52) U.S. Cl.
CPC .... *H04B 10/0793* (2013.01); *H04Q 2011/0073* (2013.01); *H04J 14/0258* (2013.01); *H04J 14/0267* (2013.01); *H04J 14/0271* (2013.01); *H04Q 11/0062* (2013.01); *H04J 14/0227* (2013.01); *H04Q 2011/0086* (2013.01); *H04J 14/0269* (2013.01); *H04J 14/0257* (2013.01)
USPC .............................................. 398/57; 398/25

(58) Field of Classification Search
USPC ...................................................... 398/25–32
See application file for complete search history.

(56) References Cited

U.S. PATENT DOCUMENTS

| | | | |
|---|---|---|---|
| 6,607,311 B1 * | 8/2003 | Fishman et al. | 398/79 |
| 6,996,342 B2 * | 2/2006 | Park et al. | 398/48 |
| 7,751,707 B2 * | 7/2010 | Zaacks et al. | 398/25 |
| 8,095,020 B2 * | 1/2012 | Nakamura | 398/208 |
| 8,412,045 B2 * | 4/2013 | Murakami et al. | 398/81 |
| 8,452,177 B2 * | 5/2013 | Stodola et al. | 398/66 |
| 8,670,666 B2 * | 3/2014 | Pastorelli et al. | 398/57 |
| 2002/0191247 A1 * | 12/2002 | Lu et al. | 359/124 |
| 2003/0142293 A1 * | 7/2003 | Wight et al. | 356/73.1 |
| 2003/0161632 A1 * | 8/2003 | Wang | 398/48 |
| 2004/0175187 A1 * | 9/2004 | Eiselt et al. | 398/173 |

(Continued)

OTHER PUBLICATIONS

"Margin." Merriam-Webster. Merriam-Webster. Web. May 25, 2012. <http://www.merriam-webster.com/dictionary/margin?show= >.*

(Continued)

*Primary Examiner* — David Payne
*Assistant Examiner* — Tanya Motsinger

(57) ABSTRACT

In an optical communication network that includes a plurality of interconnected network nodes, a method includes storing in each network node, and for each communication channel that traverses the node, one or more impairment margins of respective impairments that affect the communication channel. A potential communication channel that traverses a subset of the nodes in the network is identified. A quality of the potential communication channel is evaluated by processing the impairment margins stored in the nodes in the subset.

25 Claims, 5 Drawing Sheets

(56) References Cited

U.S. PATENT DOCUMENTS

| | | | |
|---|---|---|---|
| 2004/0190900 A1* | 9/2004 | Yagyu | 398/57 |
| 2004/0197103 A1* | 10/2004 | Roberts et al. | 398/159 |
| 2008/0080473 A1* | 4/2008 | Thubert et al. | 370/348 |
| 2008/0095058 A1* | 4/2008 | Dalmases et al. | 370/237 |
| 2009/0097866 A1* | 4/2009 | Nakamura | 398/208 |
| 2009/0116833 A1* | 5/2009 | Shimizu et al. | 398/2 |
| 2009/0162060 A1* | 6/2009 | Vasseur et al. | 398/49 |
| 2009/0269061 A1* | 10/2009 | Bardalai et al. | 398/58 |
| 2009/0269065 A1* | 10/2009 | Bardalai et al. | 398/79 |
| 2009/0274464 A1* | 11/2009 | Zi et al. | 398/79 |
| 2010/0040365 A1* | 2/2010 | Kit Leung | 398/26 |
| 2010/0166421 A1* | 7/2010 | Hashiguchi et al. | 398/26 |

OTHER PUBLICATIONS

Channel. (2001). In Hargrave's Communications Dictionary, Wiley. Retrieved from http://www.credoreference.com/entry/hargravecomms/channel.*

'Link' 2001, in Hargrave's Communications Dictionary, Wiley, Wiley, Hoboken, NJ, USA, viewed Aug. 23, 2013, <from http://www.credoreference.com/entry/hargravecomms/link>.*

* cited by examiner

CHANNEL VALIDATION IN OPTICAL NETWORKS USING MULTI-CHANNEL IMPAIRMENT EVALUATION

CROSS-REFERENCE TO RELATED APPLICATIONS

This application is a Continuation-In-Part of a U.S. patent application Ser. No. 12/430,902 entitled "Channel Validation in Optical Networks Using Multi-Channel Impairment Evaluation", whose disclosure is incorporated herein by reference.

FIELD OF THE INVENTION

The present invention relates generally to communication networks, and particularly to methods and systems for establishing communication paths in optical communication networks.

BACKGROUND OF THE INVENTION

Some optical communication networks employ Wavelength Division Multiplexing (WDM) techniques, which multiplex multiple optical carriers having different wavelengths over a single optical fiber. A variant of WDM, which is referred to as Dense WDM (DWDM), typically operates in the 1550 nm region of the infrared spectrum. Some DWDM networks are configured in mesh topologies.

The present invention will be more fully understood from the following detailed description of the embodiments thereof, taken together with the drawings in which:

DESCRIPTION OF EXAMPLE EMBODIMENTS

Overview

Figure 1:
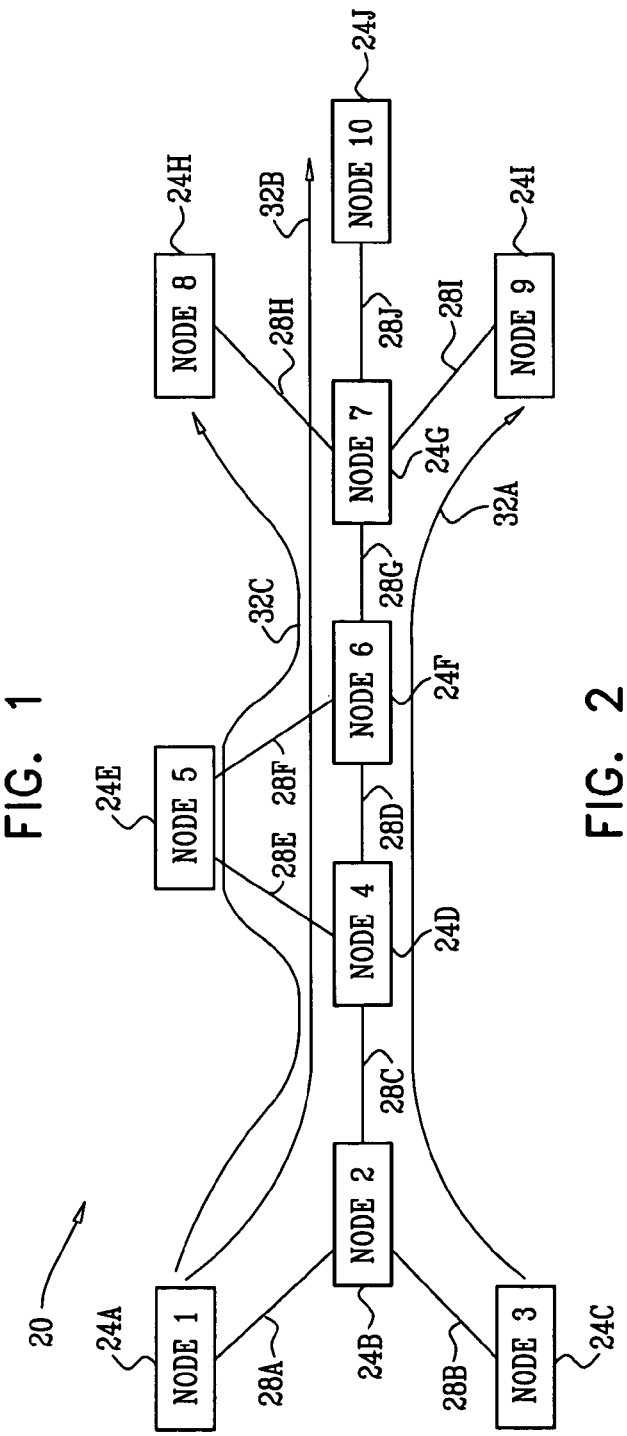
FIG. 1 is a block diagram that schematically illustrates an optical communication network, in accordance with an embodiment of the present invention.

Optical communication networks typically comprise multiple network nodes that are interconnected by optical fiber sections. The performance of optical channels traversing an optical network is affected by various kinds of optical impairments. Some optical impairments affect only a given channel and can be fully characterized using characteristics of this channel. These impairments are referred to herein as single-channel impairments. Other impairments, referred to herein as multi-channel impairments, cause a given channel to affect, or be affected by, one or more other channels in the network. Multi-channel impairments may comprise, for example, non-linear effects in optical fiber sections and/or finite channel isolation in optical components of network nodes.

When multi-channel impairments are present, the performance of a given channel depends not only on the channel in question, but also on other channels that share its optical path through the network. In particular, the feasibility of a certain optical path for establishing a new channel may depend on existing channels. Since the configuration of channels in the network ("the traffic matrix") changes over time, the feasibility of a given path may change over time, as well.

Embodiments of the present invention that are described herein provide methods and systems for validating optical paths for communication channels in an optical network. When validating an optical path for a certain communication channel, the methods and systems described herein take into account (1) the single-channel impairments that affect the feasibility of the validated channel, (2) the effect of existing channels on the validated channel due to multi-channel impairments, and (3) the effect of the validated channel on existing channels due to multi-channel impairments.

The methods and systems described herein translate the different single- and multi-channel effects on a given channel into one or more impairment margins. The impairment margin of a given channel measures the amount of additional impairment of a given type that the channel can tolerate, while still meeting its specified performance. Impairment margins may comprise, for example, cross-talk margins, Optical Signal-to-Noise Ratio (OSNR) margins, Polarization Mode Dispersion (PMD) margins and/or filtering margins.

In some embodiments, each network node comprises a local database, which holds up-to-date impairment margin values of the different channels that traverse the node. A given node may hold multiple types of impairment margins. When two channels traverse a common network node, the effect of one channel on the other can be represented as a decrease in the other channel's impairment margins, which are stored locally at the node. Using this mechanism, the network nodes validate an optical path for a communication channel by evaluating the expected performance of the channel, as well as its effect on other channels, using the impairment margins stored in the network nodes along the path.

As will be shown below, impairments can generally be classified into recoverable and irrecoverable impairments. A recoverable impairment can be improved in a given path section, even if it reached an intolerable value in a previous section along the path. An irrecoverable impairment, on the other hand, can only remain unchanged or deteriorate along the path. In other words, if such an impairment reaches an intolerable value in a given path section, it cannot be improved to a tolerable value in a subsequent section of the path.

In some embodiments, the network nodes validate paths for communication channels using a signaling protocol, which propagates and distributes the impairment margins of the different channels across the network. For recoverable impairments, local section characteristics are typically propagated, and the impairment margins evaluated jointly for an entire proposed path at the destination node. For irrecoverable impairments, evaluation is typically performed section by section, and the proposed path can be declared unfeasible as soon as the impairment level is found to be intolerable in a given section.

The disclosed methods and systems enable optical networks to validate communication channels, while taking into account multi-channel effects and changes in traffic patterns that occur over time. As a result, better channel routing and better Quality of Service (QoS) can be achieved.

System Description

FIG. 1 is a block diagram that schematically illustrates an optical communication network 20, in accordance with an embodiment of the present invention. Network 20 comprises multiple nodes 24, such as optical switches. The nodes are also referred to as network elements. In the present example, network 20 comprises ten nodes 24A . . . 24J, respectively denoted Node 1-Node 10. The network nodes are connected to one another using network sections 28, which are also referred to as network spans. In the present example, network 20 comprises ten sections 28A . . . 28J. Each section typically comprises an optical fiber.

A given node communicates over a given section by transmitting multiple optical carriers having different wavelengths. In the present example, network 20 comprises a Dense Wavelength Division Multiplexing (DWDM) network, which operates in the 1550 nm spectrum. Alternatively, however, the methods and systems described herein can be used with any other suitable type of optical communication network, such as Coarse Wavelength Division Multiplexing (CWDM) networks. Moreover, the disclosed techniques can be applied in any other suitable type of network in which the impairments can be characterized using impairment margins, such as various radio networks.

Network 20 provides communication services to end users (not shown in the figures), which are connected to the network nodes using suitable client interfaces. In order to provide these services, multiple communication channels are established via the network. Methods for validating and establishing such communication channels are described in detail further below. For example, FIG. 1 shows three channels 32A . . . 32C. Each communication channel originates at a certain node, which is referred to as a source node, traverses a certain path through the network, and terminates at a certain node, which is referred to as a destination node. In general, a certain network node may serve as a source node of a given channel, as a destination node of another channel, and as an intermediate node along the path of yet another channel.

In some embodiments, network 20 communicates using a Multi-Protocol Label Switching (MPLS) or Generalized MPLS (GMPLS) protocol, and the communication channels comprise MPLS Label Switched Paths (LSPs). MPLS is described, for example, by Rosen et al., in Request for Comments (RFC) 3031 of the Internet Engineering Task Force (IETF), entitled "Multiprotocol Label Switching Architecture," January, 2001, which is incorporated herein by reference. GMPLS is described, for example, by Mannie in IETF RFC 3945, entitled "Generalized Multi-Protocol Label Switching (GMPLS) Architecture," October, 2004, which is incorporated herein by reference. Alternatively, however, the communication channels established in network 20 may use any other suitable standard or protocol. The description that follows refers mainly to unidirectional channels, and bidirectional channels are viewed as pairs of unidirectional channels having opposite directions.

Figure 2:
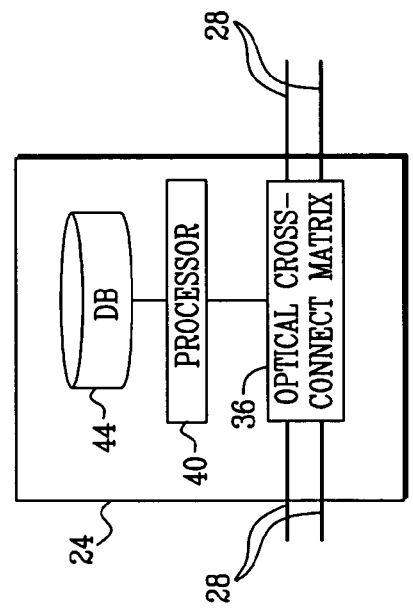
FIG. 2 is a block diagram that schematically illustrates a network node in an optical communication network, in accordance with an embodiment of the present invention.

FIG. 2 is a block diagram that schematically illustrates an example of node 24 in network 20, in accordance with an embodiment of the present invention. Node 24 comprises an optical cross-connect matrix (OXC) 36, which is coupled to sections (optical fibers) 28 that connect node 24 to other nodes of network 20. OXC 36 is configurable to switch optical carriers from one section 28 to another. In other words, the OXC can be configured to switch a given optical carrier entering the node on a given section, so that this carrier will exit the node on another section. (Generally, the disclosed techniques can be applied in various other types of network nodes, without necessarily involving OXC and/or add/drop capabilities, such as for example in line amplifiers.)

Typically, the wavelength of the optical carrier is preserved when passing through the OXC, i.e., the OXC can switch the carrier to exit on a certain desired section, but cannot change its wavelength. Network 20 can thus establish a communication channel to traverse a given path through the network by assigning a certain wavelength to the channel, and then configuring the OXCs of the nodes along the path to switch this wavelength from the previous node along the path to the next node along the path. Thus, the OXC of each node is configured in accordance with a certain routing plan, which specifies how each communication channel traversing the node is to be routed.

Each node comprises a processor 40, which controls OXC 36 of the node. Processors 40 of the different nodes participate in carrying out channel validation and establishment processes, which are described in detail below. In some embodiments, each node comprises a database 44, which holds information that is used in the channel validation processes. Typically, each node comprises a suitable memory, which holds database 44. Database 44 may comprise any suitable data structure.

The functions of processor 40 may be implemented using software, using suitable hardware, or using a combination of software and hardware elements. In some embodiments, processor 40 comprises a general-purpose processor, which is programmed in software to carry out the functions described herein. The software may be downloaded to the processor in electronic form, over network 20, for example, or it may, alternatively or additionally, be provided and/or stored on tangible media, such as magnetic, optical, or electronic memory.

Single-Channel and Multi-Channel Optical Impairments and their Effect on Channel Validation A given communication channel, such as channels 32A . . . 32C in FIG. 1, traverses a path having a number of network nodes 24 and network sections 28 before reaching its intended client interface. The optical carrier over which the channel is transmitted traverses multiple optical components, such as fiber sections, optical transceivers, optical amplifiers and OXCs. These optical components introduce various kinds of impairments, which degrade the quality of the optical carrier. This quality can be quantified, for example, by the Optical Signal-to-Noise Ratio (OSNR) of the carrier, as seen by the client interface at the destination node. Typically, the client interface requires a certain minimum OSNR. If the OSNR of the optical carrier falls below this minimum OSNR, the channel cannot deliver its specified performance.

Optical impairments that affect the performance of a given validated channel may comprise, for example, linear impairments such as path loss, optical noise and dispersion accumulation. Impairments may also be caused by non-linear effects in the optical fibers or in other components, such as Self Phase Modulation (SPM), Cross-Phase Modulation (XPM) and Four Wave Mixing (FWM).

The optical impairments can also be classified into single-channel and multi-channel impairments. Single-channel impairments can be characterized or modeled using the characteristics of only the validated channel in question and the path it traverses. Such characteristics may comprise, for example, the channel bit rate, wavelength and/or modulation format, and the path's fiber loss, chromatic dispersion and/or amplifier power. These characteristics are typically (although not necessarily) static. As such, single-channel impairments can often be evaluated when the channel is first established, and are not expected to vary considerably over time.

Multi-channel optical impairments, on the other hand, depend not only on the channel and path characteristics of the validated channel in question, but also on other channels whose path is shared, at least partially, with the path of the validated channel. Multi-channel impairments may comprise, for example, non-linear effects in the optical fiber media (e.g., FWM and XPM) and non-ideal channel isolation in the OXCs or other node components. Because of multi-channel optical impairments, the performance of a given validated channel can be affected by other channels in the network. By the same token, the given channel may affect the performance of other channels.

Since the layout and configuration of communication channels in network 20 ("the traffic matrix") may change over time, performance effects caused by multi-channel optical impairments may change over time, as well. In particular, a given channel may have a tolerable level of impairments at the time it is established, but this level may become intolerable at a later time due to the addition of other channels to the network. In another scenario, a certain path may be unsuitable for establishing a new channel at a certain time due to interference from existing channels. This path may become usable at a later time, e.g., if some of the interfering channels are taken down or re-routed.

Channel Validation Using Multi-Channel Impairment Evaluation

Embodiments of the present invention provide improved methods and systems for validating and establishing communication channels via optical networks. The methods and systems described herein take into account both single-channel and multi-channel optical impairments. In particular, validation of a proposed optical path for a new channel considers (1) the expected effects of the proposed path on the new channel's performance, (2) the expected effects of existing channels in the network on the new channel's performance, and (3) the expected effects of the new channel on the performance of existing channels.

The channel validation methods described herein use quantities, referred to as impairment margins, for measuring the level of impairments in a given channel. A given channel is typically specified to operate properly below a certain optical impairment value, depending on the properties of the client interface in question. The impairment margin of a given channel measures the amount of additional impairment of a given type, which can be endured by the channel without deviating from its specified performance. In other words, the impairment margin of a given channel quantifies the amount of additional impairments of a given type that the channel can tolerate.

The description that follows focuses particularly on multi-channel impairments and optical cross-talk, and considers the resulting cross-talk margins. This choice, however, is made purely for the sake of conceptual clarity. In alternative embodiments, any other suitable type of impairments and impairment margins can also be used. Example types of impairment margins comprise Optical Signal-to-Noise Ratio (OSNR) margins, Polarization Mode Dispersion (PMD) margins and/or filtering margins.

In some embodiments, each node 24 in network 20 holds the cross-talk margin of each channel traversing this node. The cross-talk margins are stored in database 44 of the node. In order to take into account multi-channel impairments, nodes 24 use the locally-stored cross-talk margin values to validate proposed paths for new channels in a distributed manner. (Generally, a given node may hold multiple impairment margins of different types, and channel evaluation may consider any of these impairment margin types for both single channel and multi-channel impairments.)

Recoverable and Irrecoverable Impairments

Some optical impairments can be classified as Recoverable Impairments (RI), whereas other impairments can be classified an Irrecoverable Impairments (IRI). A recoverable impairment can be improved in a given path section, even if it reached an intolerable value in a previous section along the path. An irrecoverable impairment, on the other hand, causes irreversible performance degradation, and can therefore only remain unchanged or deteriorate along the path. If an irrecoverable impairment reaches an intolerable value in a given path section, it cannot be improved to a tolerable value in a subsequent section of the path. Recoverable impairments may comprise, for example, optical power. Irrecoverable impairments may comprise, for example, OSNR.

Channel Evaluation Method Description

Figure 3:
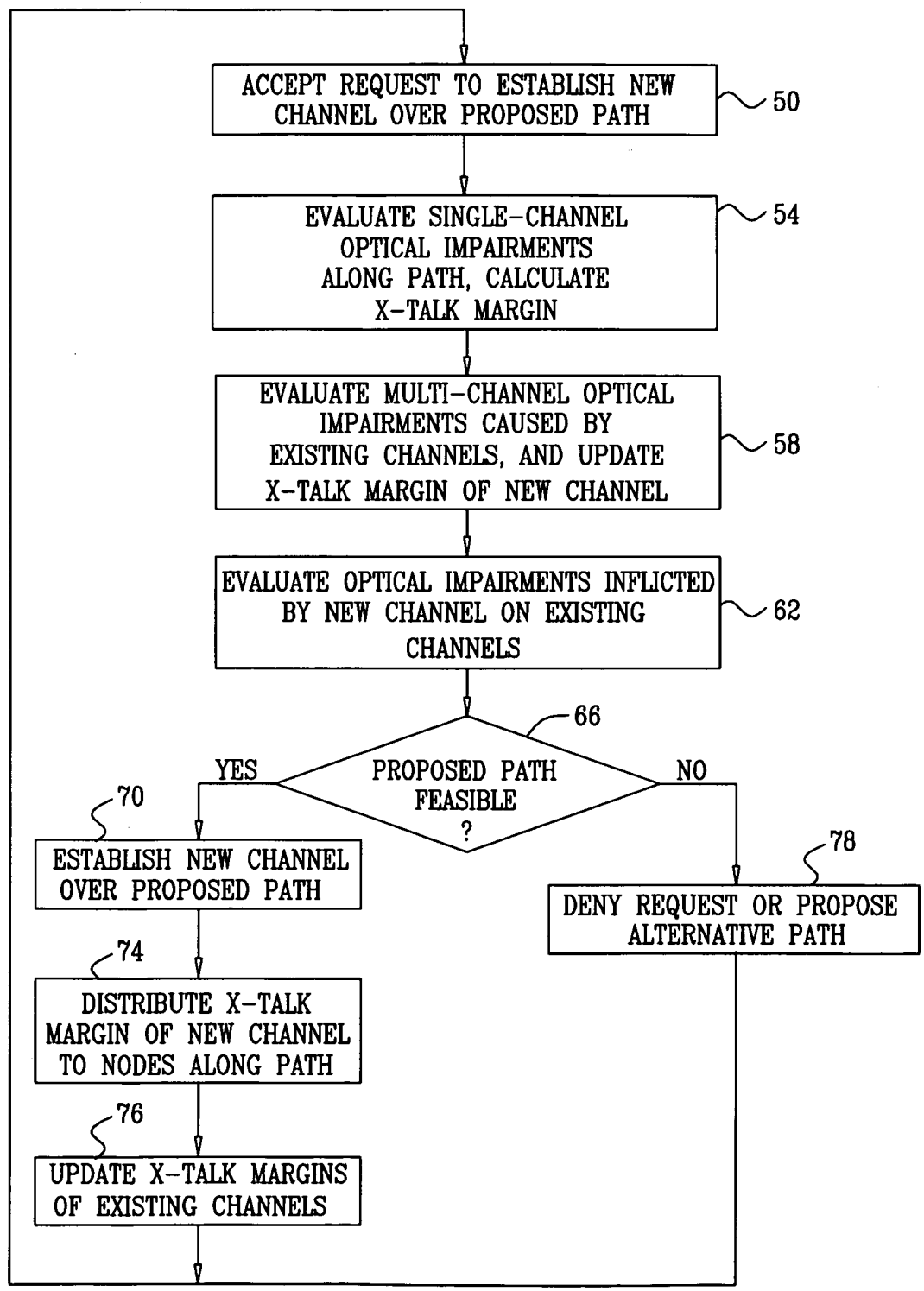
FIGS. 3 and 4 are flow charts that schematically illustrate methods for establishing a communication channel in an optical communication network, in accordance with embodiments of the present invention.
Figure 6:
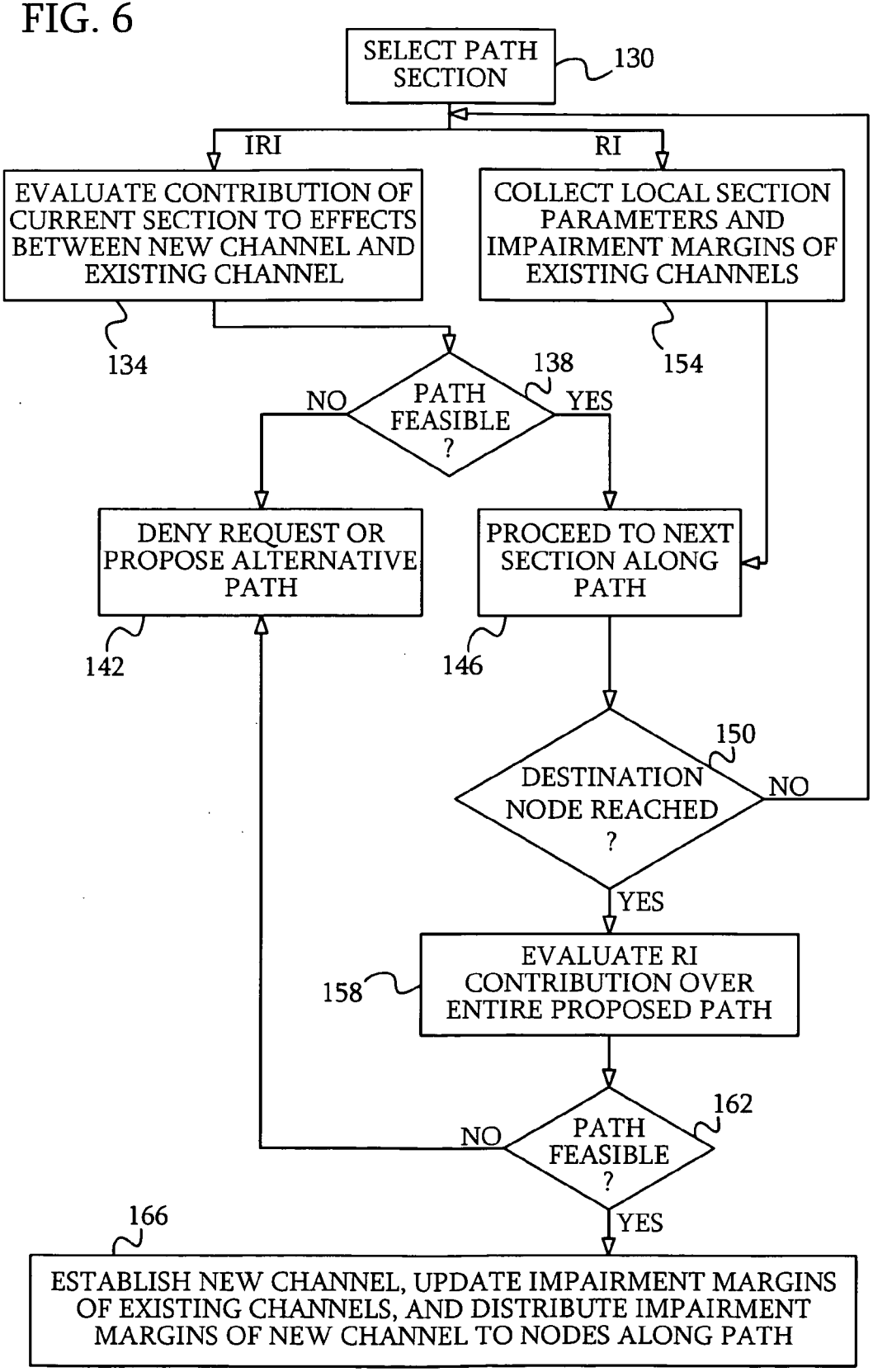
FIG. 6 is a flow chart that schematically illustrates a method for establishing a communication channel in an optical communication network, in accordance with an embodiment of the present invention.

FIG. 3 is a flow chart that schematically illustrates a method for establishing a new communication channel in optical communication network 20, in accordance with an embodiment of the present invention. The method of FIG. 3 is suitable for the evaluation of recoverable and irrecoverable impairments, when the feasibility decision is taken at the end of the path evaluation. An alternative method, which applies different processing to recoverable and irrecoverable impairments, is shown in FIG. 6 below. In some embodiments, appropriate impairment models can be used to approximate recoverable impairments as irrecoverable impairments. The methods described herein are independent of the actual models that are used for modeling the impairments.

The method of FIG. 3 begins with network 20 receiving a request to establish a new channel over a proposed path through the network, at a path requesting step 50. The proposed path enters the network at a certain source node and exits the network at a certain destination node. The request is typically provided to the source node.

The nodes along the proposed path evaluate the single-channel optical impairments along the path, at a single-channel evaluation step 54. Typically, each node along the proposed path evaluates the single-channel impairments contributed by its own components (e.g., OXC) and by the local section 28 connected to the node. The nodes may use any suitable model or formula for assessing the single-channel impairments based on characteristics of the channel, the node and the local section (e.g., amplifier power, span loss, span dispersion, fiber type and length, optical component characteristics, wavelength and/or channel bit rate). Each node sends its evaluation results to the next node along the path, which relays the results onwards toward the destination node. The destination node receives the evaluation results from the different nodes along the path, and calculates the impairment margin of the proposed path based on these results.

In addition, the nodes along the proposed path evaluate the multi-channel optical impairments, which are inflicted on the new channel by existing channels, at a first multi-channel evaluation step 58. Each node along the path considers the existing channels that traverse the node, and evaluates the effect of these channels on the new channel. The nodes may use any suitable model or formula for assessing the multi-channel impairments based on characteristics of the channel, the node and the local section. Each node sends its multi-channel effect evaluation results to the next node along the path, until the results reach the destination node. The destination node updates the cross-talk margin of the proposed path based on the multi-channel effect results.

Each node along the proposed path also evaluates the effect of the new channel on the affected existing channels that traverse the node, at a second multi-channel evaluation step 62. Typically, each node calculates the additional cross-talk that the new channel is expected to inflict on a given existing channel traversing the node. The node then compares the expected accumulated cross-talk to the cross-talk margin of the existing channel, which is stored locally in database 44 of the node. If the expected accumulated cross-talk is smaller than the locally-stored margin of the existing channel, then the impact of the new channel on the existing channel at this node is considered tolerable, and vice versa. Each node along the path informs the destination node whether or not the effect of the new channel on existing channels is acceptable or not.

Note that although steps 54-62 above are described separately and sequentially, this order is chosen purely for the sake of conceptual clarity. Each node may perform the calculations involved in these steps at any desired order and at any suitable time. For example, the nodes may perform the calculations of steps 54-62, and then send all evaluation results together to the destination node. An example of a signaling scheme that carries out these tasks is described in FIG. 4 below.

At this stage, the destination node has sufficient information as to the feasibility of the proposed path, taking into account single-channel effects within the new channel itself, effects of existing channels on the new channel, and effects of the new channel on existing channels. The destination node decides whether or not the proposed path is feasible for establishing the new channel, at a feasibility decision step 66. The proposed path is considered feasible if (1) the cumulative impairment caused by single-channel effects is within the specified performance range of the client interface at the destination node, (2) the cross-talk inflicted on the new channel by existing channels is smaller than the cross-talk margin of the new channel, and (3) the additional cross-talk inflicted by the new channel on any existing channel is smaller than the cross-talk margin of that existing channel.

If the destination node concludes that the proposed path is feasible, the destination node initiates establishment of the new channel over this path, at a path establishment step 70. The destination node distributes the impairment margins of the new channel (which account for both single-channel and multi-channel effects) to the nodes along the path, at a distribution step 74. Each node along the path stores the margins of the new channel in its local database 44.

The nodes along the path update the cross-talk margins of the existing channels, at an existing cross-talk margin updating step 76. Each node along the path updates the cross-talk margin of each existing channel traversing the node, using the evaluation results calculated at step 62 above. Additionally, the node initiates a process in which the different nodes along the path of this existing channel update their locally-stored cross-talk margins, as well. As a result, for each existing channel whose path is at least partially shared with the new channel, the cross-talk margins stored in the nodes of the existing channel are updated to take into account the effects of the new channel. An example of a process for updating cross-talk margins is described in FIG. 5 below.

The process of FIG. 3 is carried out when a new channel is to be established. In some embodiments, however, different parts of this process can be carried out under different circumstances, not necessarily related to establishment of a new channel. For example, evaluation of multi-channel impairments (e.g., steps 58 and 62 of FIG. 3) can be implemented at different points in time, e.g., at periodic intervals, in response to a command from an operator or upon detection of a change in the network configuration or traffic properties. In many cases, the evaluation of single channel impairments (step 54 of FIG. 3) needs not be repeated after the channel has been established, since these impairments do not depend on other channels and usually do not change over time.

Example Signaling Schemes

The channel validation process of FIG. 3 is distributed in nature, and involves communication among nodes 24 of network 20. This communication can be carried out using various signaling schemes and protocols. The description that follows presents an example implementation, which can be used for establishing LSPs in MPLS or GMPLS networks. In these network types, resource reservation for network channels is sometimes carried out using the well-known RSVP reservation protocol. RSVP is described, for example, by Braden et al. in IETF RFC 2205, entitled "Resource ReSerVation Protocol (RSVP)—Version 1 Functional Specification," September 1997, which is incorporated herein by reference. The methods of FIGS. 4 and 5 below use the general framework of RSVP, with a possible addition or modification of certain message fields.

Figure 4:
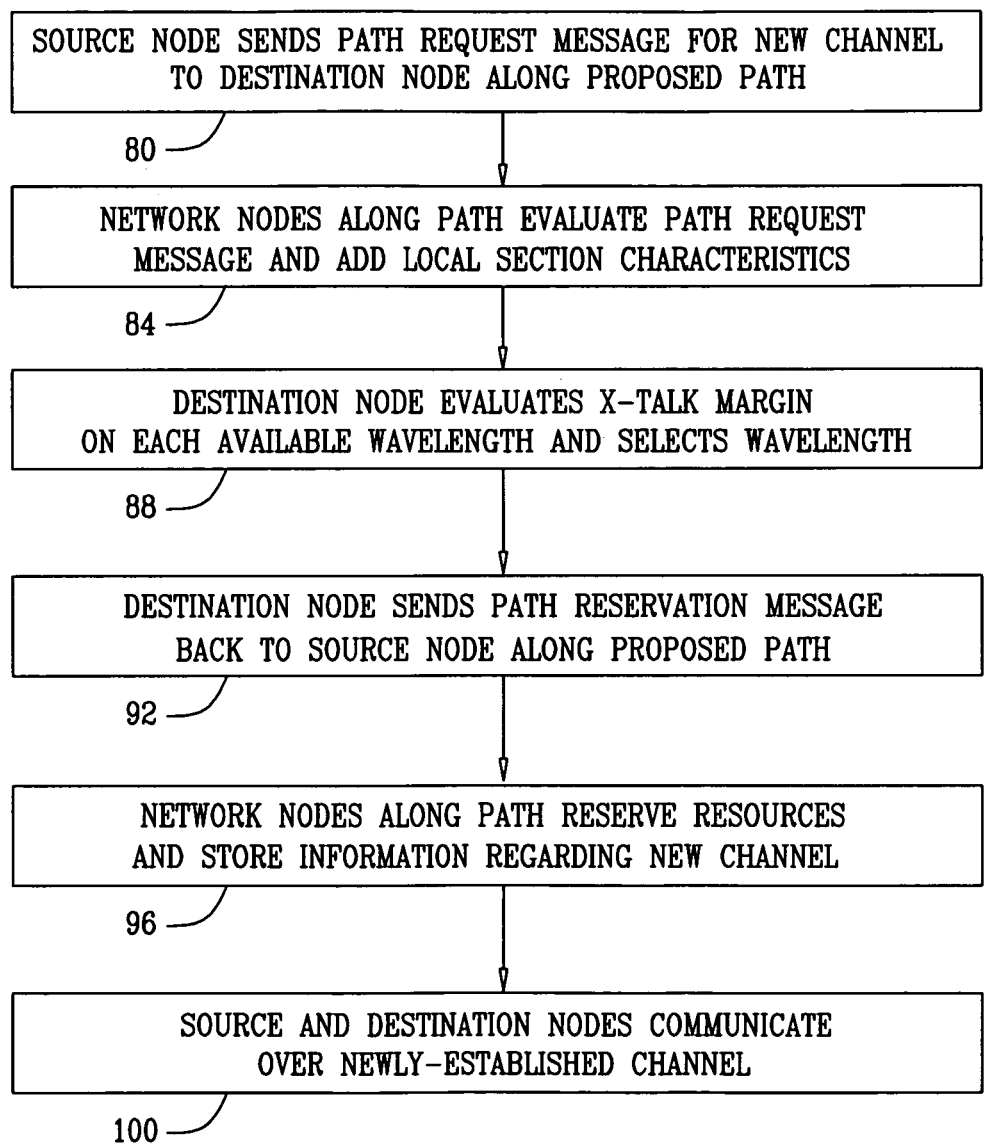

FIG. 4 is a flow chart that schematically illustrates a signaling process for establishing a new LSP through network 20, in accordance with an embodiment of the present invention. FIG. 4 illustrates an example signaling scheme for carrying out the method of FIG. 3 above, in the event that the proposed path is fund to be feasible.

The method of FIG. 4 begins with the source node of the new channel sending a path request message to the destination node via the proposed path, at a path request sending step 80. The path request message may comprise, for example, an RSVP PATH message. The network nodes along the proposed path receive and relay the path request message en-route to the destination node, at a request relaying step 84. Each node along the path adds its local section characteristics to the message, so as to provide the destination with sufficient information for computing the impairment margins of the channel (see also the description of steps 54-62 of FIG. 3 above). The local section information may comprise, for example, section characteristics (e.g., the section length and fiber type), transmission power of the channel in question over the section and information (e.g., type, power and wavelength) of existing active channels in neighboring optical wavelengths (carriers) on this section.

In some embodiments, the proposed path comprises two or more unused wavelengths, which may be selected for establishing the new channel. (The channel is to be established over the same wavelength throughout the path, but the sections along the path may have several possible wavelengths that are unused end-to-end.) The optical impairments often differ from one wavelength to the other.

The destination node receives the path request message, which now comprises the accumulated characteristics contributed by the different nodes along the path. The destination node evaluates the channel cross-talk margin on each available wavelength and selects a wavelength for the channel, at a wavelength selection step 88. For example, the destination node may select the wavelength having the highest cross-talk margin.

In some embodiments, the destination node computes the total SPM, XPM and FWM on the new channel based on the local section characteristics reported in the path request message. The destination node may calculate the degradation in OSNR margin that is caused by the channel SPM, the degradation of the OSNR margin that is caused by the total accumulated cross-talk, taking into account the reported XPM and FWM, and the resulting cross-talk margin for the particular client interface used.

In some embodiments, the destination node also evaluates the effect of the new channel on existing channel for each wavelength that is available along the proposed path, and selects the wavelength based on the results of this evaluation. For each section of the proposed path, for each wavelength and for each existing channel, the destination node evaluates the residual cross-talk margin of the existing channel, if the new channel were to be established over the wavelength in question. This evaluation is performed using the cross-talk margins of the existing channels that are stored in databases 44 of the nodes along the proposed path.

The effect of the new channel on the existing channel can be evaluated, per section, by evaluating:
- The section's additional XPM cross-talk as a function of the properties of the existing channels. Relevant properties of a given existing channel may comprise, for example, the channel type (e.g., bit rate, modulation format or transponder class), the frequency separation of the channel with respect to the new channel, the signal power of the new channel and the residual dispersion to the destination node of the existing channels.
- The section's additional FWM cross-talk as a function of, for example, allocation of existing channels in neighboring wavelengths and the signal power of the new channel.

The total additional cross-talk inflicted on an existing channel by the new channel in a given section can be evaluated by summing the section's additional XPM and FWM cross-talk values.

Having selected the appropriate wavelength, the destination node sends a resource reservation message along the path to the source node, at a reservation sending step 92. The reservation message may comprise, for example, an RSVP RESV message. The reservation request message typically specifies the resources (e.g., wavelength and bandwidth) that are to be reserved to the new channel in the nodes and sections along the path. Typically, the reservation message also conveys the cross-talk margin of the new channel, as computed by the destination node. The reservation message may also indicate the type and/or class of the new channel, and/or the total dispersion in the new channel.

The nodes along the path receive the reservation request message and reserve resources accordingly, at a resource reservation step 96. Each node along the path allocates resources for the new channel, as requested in the reservation request message. In particular, each node configures its OXC 36 to route the channel over the selected wavelength. Each node also extracts the cross-talk margin of the channel from the reservation request message, and stores the cross-talk margin in its local database 44, for use in subsequent channel validation processes.

Each node along the path may also evaluate the additional cross-talk inflicted on the existing channels that traverse the node, based on the actual status of the local section. (This value may differ from the value sent in the path reservation message, for example when additional channels have been newly established.) The node stores these newly calculated cross-talk values in its database 44. (When a channel is taken down (or when a channel setup procedure is rolled back due to an error), the nodes along the path of this channel update the cross-talk margins of the existing channels in a similar manner.)

In some embodiments, each node may compute the residual dispersion for the local section, based on the total dispersion value sent by the destination node in the reservation request message and on the dispersion data sent by the source node in the path request message. Each node may also schedule an updating of existing channel status at this point. A typical refresh interval is on the order of 30 seconds, although any other suitable value can be used.

At this point the channel is established, and data can be sent from the source node to the destination node over the newly-established channel, at a communication step 100.

The signaling scheme described above will now be demonstrated with reference to the network configuration of FIG. 1. In FIG. 1, assume that channels 32B and 32C comprise LSPs that are already set-up and operating in network 20. Channel 32A comprises a new channel that is to be established from node 24C to node 24I. As described above, the source node (node 24C) initiates a PATH message toward the destination node (node 24I). As the PATH message traverses the proposed path of channel 32A, the nodes along the path add local section information to the message. For example, node 24B adds local information regarding channels 32B and 32C in section 28C. Node 24D adds local information regarding channel 32B in section 28D. Node 24F adds local information regarding channels 32B and 32C in section 28G.

Destination node 24I returns a RESV message back toward source node 24C. In response to this message, the nodes along the path of channel 32A update the cross-talk margins of the new channel and of the existing channels. In particular, node 24G updates the cross-talk margin of channel 32B regarding section 28G, and sends a refresh message toward node 24J for updating this margin. Node 24G also updates the cross-talk margin of channel 32C regarding this section, and sends a refresh message toward node 24H with the updated margin.

Similarly, node 24F updates the cross-talk margin of channel 32B regarding section 28D, and sends a suitable refresh message toward node 24J. Node 24D updates the cross-talk margin of channel 32B regarding section 28C, and sends a corresponding refresh message toward node 24J. Node 24D also updates the cross-talk margin of channel 32C regarding section 28C, and sends a corresponding refresh message toward node 24H.

Adaptation to Network Configuration Changes

In some embodiments, nodes 24 update the information stored in their local databases 44 in response to changes that occur in the network configuration.

Figure 5:
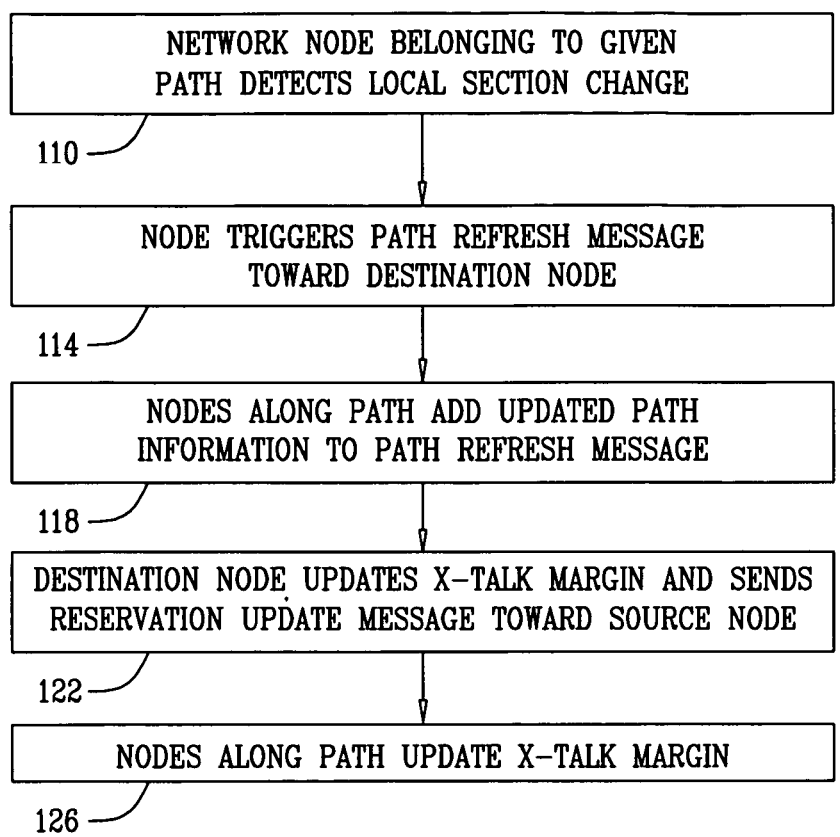
FIG. 5 is a flow chart that schematically illustrates a method for updating information regarding a communication channel in an optical communication network, in accordance with an embodiment of the present invention.

FIG. 5 is a flow chart that schematically illustrates a method for updating information regarding a communication channel, in accordance with an embodiment of the present invention. The method begins with a given node, which belongs to the path of a certain channel, detecting a change in its local section, at a change detecting step 110. The detected change may comprise any type of change in the node and/or the local section 28, which may have an effect on optical impairments. The node in question initiates a PATH REFRESH message toward the destination node, at a path refresh sending step 114. In this message, the node reports the detected change.

The nodes along the path add updated local path information, if applicable, to the path refresh message, and relay the message toward the destination node, at a refresh relaying step 118. The destination node receives the message, and updates the cross-talk margin of the channel using the updated local information sent by the nodes, at a cross-talk updating step 122. The destination node sends a reservation refresh message (e.g., an RSVP RESV REFRESH message) along the path, back to the source node. The reservation refresh message specifies the updated cross-talk margin value. Additionally, the message may update resource allocations of the channel that are to be modified in response to the detected change. For example, the destination node may request that the channel be moved to a different wavelength in response to a certain detected change in the network configuration.

The nodes along the path receive and act upon the reservation refresh message, at a refreshing step 126. In particular, the nodes store the updated cross-talk margin value in their local databases, and may update the resources allocated to the channel, if applicable.

In the embodiments described herein, the relevant information for validating a proposed path for a new channel is propagated toward the destination node of the new channel. The destination node processes the information and determines whether the proposed path is feasible or not. In alternative embodiments, however, the methods and systems described herein can be carried out, mutatis mutandis, by any other network node or group of nodes, such as by the source node of the new channel.

Channel Evaluation Considering Recoverable and Irrecoverable Impairment Types

FIG. 6 is a flow chart that schematically illustrates a method for establishing a communication channel in optical communication network 20, in accordance with an alternative embodiment of the present invention. Unlike the method of FIG. 3 above, in the method of FIG. 6 the network nodes apply different processing to recoverable and irrecoverable impairments. When considering a recoverable impairment, the processing applied is similar to the method of FIG. 3. When considering an irrecoverable impairment, on the other hand, path feasibility is tested section by section along the proposed path. If the impairment level is found to be intolerable in a given section, the proposed path is declared unfeasible without proceeding to subsequent sections. Thus, the method of FIG. 6 provides superior processing efficiency when considering irrecoverable impairments.

The method of FIG. 6 begins with network 20 accepting a request to set up a new communication channel over a certain proposed path. The proposed path traverses a set of network sections, from the source node to the destination node. The network nodes begin evaluation of the proposed path by selecting the first section along the path, at a section selection step 130.

For Irrecoverable Impairments (IRI), the node adjacent to the current section evaluates the impairments contributed in the current section to the single- and multi-channel effects affecting the new channel, at an IRI local evaluation step 134. This evaluation considers both the effect of the new channel on existing channels, and the effect of existing channels on the new channel, as described above. The node checks whether the proposed path is feasible, based on the contribution of the local section, at an IRI feasibility checking step 138. Typically, the node compares the contribution of the current section to the (IRI) impairment margins of the new and existing channels, which are stored locally at the node.

If the node concludes, based on the accumulated contribution of the previous and the current sections, that the proposed path is unfeasible, network 20 denies the proposed path, at a failure step 142. The network may sometimes propose a new optical path, as described above. If, on the other hand, the impairments contributed in the current section do not cause the new channel to become unfeasible, the nodes proceed to evaluate the next section along the path, at a next section selection step 146. The nodes check whether the destination node has been reached (i.e., whether the entire proposed path has been traversed), at a destination checking step 150. If the destination node was not reached yet, the method loops back to evaluate the next section.

For Recoverable Impairments (RI), the node collects the characteristics of the current section and propagates them to the destination node, at a local RI evaluation step 154. This process is similar to the one described in FIG. 3 above, and may use the signaling scheme of FIG. 4 above. The process of steps 134-150 continues until the path is denied due to IRI at step 142 or until the entire proposed path is traversed.

When the entire path is traversed (and assuming traversal is not terminated due to IRI), the destination node evaluates the RI contributed by the different sections, at a joint RI evaluation step 158. This process is similar to the one performed at steps 54-62 of FIG. 3 above, or step 88 of FIG. 4 above.

Based on this evaluation, the destination node determines whether the proposed path is feasible, at a RI feasibility checking step 162. If the path is not feasible due to RI, the proposed path is denied and the method terminates at step 142. Otherwise, i.e., if the path is feasible, the destination node establishes the new channel over the proposed path, at a new channel setup step 166. The destination node typically updates the impairment margins of the existing channels due to addition of the new channel, and also distributes the impairment margins of the new channel to the nodes along the path. This process is similar to the one described in steps 70-76 of FIG. 3 above.

Although the embodiments described herein mainly address channel and path evaluation in DWDM mesh topologies, the principles of the present invention can also be used in various other network topologies. Although the embodiments described herein refer mainly to evaluating a path for a new channel being established, the disclosed techniques can also be used in off-line tools, such as for network planning.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
in an optical communication network that includes a plurality of interconnected network nodes, storing in each network node, for each communication channel that traverses the node, one or more respective impairment margins with respect to impairments that affect the communication channel, each impairment margin indicating an amount of impairment that the communication channel can tolerate and remain within specified performance criteria;

identifying a potential communication channel that traverses a subset of the nodes in the network; and determining a quality of the potential communication channel by evaluating the impairment margins stored in the nodes in the subset, wherein determining the quality comprises evaluating the impairments inflicted on the potential communication channel by at least one other communication channel that traverses at least one of the nodes in the subset using the impairment margins stored in the at least one of the nodes, and evaluating the impairments inflicted by the potential communication channel on at least one other communication channel that traverses at least one of the nodes in the subset using the impairment margins stored in the at least one of the nodes.

2. The method according to claim 1, wherein the nodes in the subset are arranged along a path comprising network sections in the optical communication network over which the potential communication channel traverses from a source node to a destination node, and wherein determining the quality comprises assessing a feasibility of the potential communication channel in a given network section, and assessing the feasibility in a subsequent network section along the path only when the potential communication channel is feasible in the given network section.

3. The method according to claim 2, wherein determining the quality comprises, responsively to determining that the potential communication channel is unfeasible in the given network section, denying setting-up of the potential communication channel over the path.

4. The method according to claim 1, wherein the impairment margins comprise at least one margin type selected from a group of types consisting of a cross-talk margin, an optical power margin, a Signal-to-Noise Ratio (SNR) margin, a Polarization Modulation Dispersion (PMD) margin and a filtering margin.

5. The method according to claim 1, wherein the network nodes are interconnected by network sections, and wherein determining the quality comprises collecting from each node in the subset characteristics of a respective local network section connected to the node, and estimating a given impairment margin of the potential communication channel using the collected characteristics.

6. The method according to claim 5, wherein the nodes in the subset are arranged along a path that traverses the optical communication network from a source node to a destination node, and wherein collecting the characteristics comprises propagating a path request message from the source node to the destination node via the nodes in the subset, and adding the respective characteristics to the path request message by each of the nodes in the subset, so as to accumulate the characteristics and estimate the given impairment margin at the destination node.

7. The method according to claim 6, and comprising propagating a path reservation message, which comprises the estimated given impairment margin of the potential communication channel, from the destination node to the source node via the nodes in the subset, and updating the given impairment margin of the potential communication channel stored in each of the nodes in the subset responsively to the path reservation message.

8. The method according to claim 5, wherein collecting the characteristics comprises detecting by one of the nodes in the subset a change related to the respective local network section, and updating the collected characteristics and re-estimating the given impairment margin of the potential communication channel responsively to the detected change.

9. The method according to claim 1, wherein determining the quality comprises assessing a feasibility of establishing the potential communication channel over a proposed optical path.

10. The method according to claim 9, wherein assessing the feasibility comprises selecting an optical wavelength for the potential communication channel over the proposed optical path.

11. The method according to claim 1, and comprising routing traffic over the potential communication channel responsively to the evaluated quality.

12. A method comprising:

in an optical communication network that includes a plurality of interconnected network nodes, storing in each network node, for each communication channel that traverses the node, one or more respective impairment margins with respect to impairments that affect the communication channel, each impairment margin indicating an amount of impairment that the communication channel can tolerate and remain within specified performance criteria;

identifying a potential communication channel that traverses a subset of the nodes in the network, wherein the network nodes are interconnected by network sections;

collecting from each node in the subset characteristics of a respective local network section connected to the node, and estimating a given impairment margin of the potential communication channel using the collected characteristics, wherein the nodes in the subset are arranged along a path that traverses the optical communication network from a source node to a destination node, and wherein collecting the characteristics comprises propagating a path reservation message, which contains the estimated given impairment margin of the potential communication channel, from the destination node to the source node via the nodes in the subset, updating the given impairment margin of the potential communication channel stored in each of the nodes in the subset in response to the path reservation message, and adding the respective characteristics to the path request message by each of the nodes in the subset, so as to accumulate the characteristics and estimate the given impairment margin at the destination node;

determining a quality of the potential communication channel by evaluating the impairment margins stored in the nodes in the subset; and updating, in a given node in the subset, the stored impairment margins of one or more other communication channels that traverse the given node in response to the path reservation message.

13. The method according to claim 12, and comprising causing the network nodes traversed by the one or more other communication channels to update the stored impairment margins of the one or more other communication channels.

14. An optical communication network, comprising a plurality of interconnected network nodes, wherein each of the nodes is coupled to store, for each communication channel that traverses the node, one or more respective impairment margins with respect to impairments that affect the communication channel, each impairment margin indicating an amount of impairment that the communication channel can tolerate and remain within specified performance criteria and wherein a subset of the nodes are coupled to determine a quality of a potential communication channel that traverses the nodes in the subset by evaluating the impairment margins stored in the nodes in the subset, by evaluating the impairments inflicted on the potential communication channel by at least one other communication channel that traverses at least one of the nodes in the subset using the impairment margins stored in the at least one of the nodes, and evaluating the impairments inflicted by the potential communication channel on at least one other communication channel that traverses at least one of the nodes in the subset using the impairment margins stored in the at least one of the nodes.

15. The network according to claim 14, wherein the nodes in the subset are arranged along a path comprising network sections in the optical communication network traversed by the potential communication channel from a source node to a destination node, and wherein the nodes in the subset are coupled to assess a feasibility of the potential communication channel in a given network section, and to assess the feasibility in a subsequent network section along the path only when the potential communication channel is feasible in the given network section.

16. The network according to claim 15, wherein the nodes in the subset are coupled, responsively to determining that the potential communication channel is unfeasible in the given network section, to deny setting-up of the potential communication channel over the path.

17. The network according to claim 14, wherein the impairment margins comprise at least one margin type selected from a group of types consisting of a cross-talk margin, an optical power margin, a Signal-to-Noise Ratio (SNR) margin, a Polarization Modulation Dispersion (PMD) margin and a filtering margin.

18. The network according to claim 14, wherein the network nodes are interconnected by network sections, and are coupled to collect from each node in the subset characteristics of a respective local network section connected to the node, and to estimate a given impairment margin of the potential communication channel using the collected characteristics.

19. The network according to claim 18, wherein the nodes in the subset are arranged along a path in the optical communication network over which the potential communication channel traverses from a source node to a destination node, wherein the source node is coupled to propagate a path request message to the destination node via the nodes in the subset, and wherein each of the nodes in the subset is coupled to add the characteristics of the respective local network section to the path request message, so as to accumulate the characteristics and estimate the given impairment margin at the destination node.

20. The network according to claim 18, wherein each of the nodes in the subset is coupled to detect a change related to the respective local network section, and to cause an update of the collected characteristics and a re-estimation of the given impairment margin of the potential communication channel responsively to the detected change.

21. A node in an optical communication network, the node comprising:
 a memory, which is coupled to store, for each of a plurality of communication channels that traverses the node, one or more respective impairment margins with respect to impairments that affect the communication channels, each impairment margin indicating an amount of impairment that a corresponding one of the communication channels can tolerate and remain within specified performance criteria; and
 a processor, which is coupled to communicate with a subset of the nodes so as to determine a quality of a potential communication channel that traverses the nodes in the subset by evaluating the impairment margins stored in the nodes in the subset, by evaluating the impairments inflicted on the potential communication channel by at least one other communication channel that traverses at least one of the nodes in the subset using the impairment margins stored in the at least one of the nodes, and evaluating the impairments inflicted by the potential communication channel on at least one other communication channel that traverses at least one of the nodes in the subset using the impairment margins stored in the at least one of the nodes.

22. The node of claim 21, wherein the processor is configured to detect a change in a local network section and update the impairment margins of the one or more communication channels stored at the node in response to the detected change.

23. The node of claim 21, wherein the processor is configured to evaluate the impairment margins by at least evaluating one margin type selected from a group of types consisting of a cross-talk margin, an optical power margin, a Signal-to-Noise Ratio (SNR) margin, a Polarization Modulation Dispersion (PMD) margin and a filtering margin.

24. The node of claim 21, wherein the processor is configured to collect from other network nodes, characteristics of a respective local network section connected to the node, and estimate a given impairment margin of the potential communication channel using the collected characteristics.

25. The node of claim 21, wherein the processor, is configured to add the characteristics of the respective local network section to the path request message, in response to receiving a path request message, so as to accumulate the characteristics and estimate the given impairment margin at a destination node.

* * * * *